United States Patent [19]

Stephens

[11] Patent Number: 5,707,288
[45] Date of Patent: Jan. 13, 1998

[54] VIDEO GAME SYSTEM AND METHODS FOR ENHANCED PROCESSING AND DISPLAY OF GRAPHICAL CHARACTER ELEMENTS

[75] Inventor: Adrian Stephens, San Francisco, Calif.

[73] Assignee: Sega Enterprises, Ltd., Tokyo, Japan

[21] Appl. No.: 761,990

[22] Filed: Dec. 11, 1996

Related U.S. Application Data

[63] Continuation of Ser. No. 381,563, Dec. 31, 1994, abandoned.

[51] Int. Cl.$^6$ ........................................ A63F 9/24
[52] U.S. Cl. ........................ 463/33; 463/31; 345/114; 345/122; 395/152; 395/158; 395/118
[58] Field of Search ........................ 273/460, 461; 364/410; 345/112, 113, 114, 115, 116, 118, 119, 121, 122; 395/118, 129, 135, 152, 157, 158, 173, 501; 463/1, 30, 31, 32, 33, 34, 35

[56] References Cited

U.S. PATENT DOCUMENTS

| | | | |
|---|---|---|---|
| Re. 34,161 | 1/1993 | Nakagawa et al. | 273/85 G |
| 4,107,780 | 8/1978 | Grimsdale et al. | 395/158 |
| 4,156,237 | 5/1979 | Okada et al. | 345/113 |
| 4,167,019 | 9/1979 | Shepperd | 358/22 |
| 4,169,272 | 9/1979 | Rains et al. | 358/180 |
| 4,180,805 | 12/1979 | Burson | 340/709 |
| 4,200,867 | 4/1980 | Hill | 340/703 |
| 4,296,930 | 10/1981 | Frederiksen | 273/DIG. 28 |
| 4,305,131 | 12/1981 | Best | 364/521 |
| 4,355,805 | 10/1982 | Baer et al. | 273/85 |
| 4,445,187 | 4/1984 | Best | 364/521 |
| 4,498,079 | 2/1985 | Ghosh | 340/725 |
| 4,517,654 | 5/1985 | Carmean | 273/85 G |
| 4,521,020 | 6/1985 | Uemura et al. | 273/85 |
| 4,542,903 | 9/1985 | Yokoi et al. | 273/85 |
| 4,560,170 | 12/1985 | Enyi | 273/248 |
| 4,561,659 | 12/1985 | Redfield et al. | 273/437 |
| 4,569,526 | 2/1986 | Hamilton | 273/242 |
| 4,572,506 | 2/1986 | DiOrio | 273/DIG. 28 |
| 4,580,782 | 4/1986 | Ochi | 273/86 |
| 4,600,200 | 7/1986 | Oka et al. | 273/313 |
| 4,660,157 | 4/1987 | Beckwith et al. | 364/522 |
| 4,666,160 | 5/1987 | Hamilton | 273/242 |
| 4,692,759 | 9/1987 | Phan Van Cang | 345/113 |
| 4,738,451 | 4/1988 | Logg | 273/153 |
| 4,766,541 | 8/1988 | Bleich et al. | 364/410 |
| 4,816,812 | 3/1989 | Iida | 345/115 |
| 4,824,106 | 4/1989 | Ueda et al. | 273/1 |
| 4,834,374 | 5/1989 | Nakamura et al. | 273/1 |
| 4,841,291 | 6/1989 | Swix et al. | 340/725 |
| 4,871,167 | 10/1989 | Pasiero, Jr. | 273/1 |
| 4,890,833 | 1/1990 | Lantz et al. | 273/1 |
| 4,894,774 | 1/1990 | McCarthy et al. | 273/85 G |
| 5,016,876 | 5/1991 | Loffredo | 273/437 |
| 5,122,952 | 6/1992 | Minkus | 364/419 |
| 5,122,972 | 6/1992 | Richards et al. | 395/157 |
| 5,125,571 | 6/1992 | Ueda et al. | 273/437 |

(List continued on next page.)

*Primary Examiner*—Jessica Harrison
*Assistant Examiner*—Mark A. Sager
*Attorney, Agent, or Firm*—Dergosits & Noah LLP

[57] ABSTRACT

Videogame systems and methods are provided to enhance the capability of the videogame system controller and data storage to provide graphic character element storage and processing. A display list technology utilizes an intentionally generated, location-specific vertical interrupt to implement a routine to modify or to alter existing graphical character elements. A second technique involves the definition of a small portion of the graphics map which is displayed differently than the balance of the graphics map because the stored priority bit is expressed in the defined area, but suppressed and replaced in all other areas. The third technique employs a virtual character element library to map the character elements appearing on the display, and recognizes available space within the video random access memory character element storage to provide a dynamic memory space.

1 Claim, 6 Drawing Sheets
(2 of 6 Drawing(s) in Color)

U.S. PATENT DOCUMENTS

| | | | |
|---|---|---|---|
| 5,128,658 | 7/1992 | Pappas et al. | 345/114 |
| 5,150,312 | 9/1992 | Beitel et al. | 345/113 |
| 5,237,654 | 8/1993 | Shackelford et al. | 395/157 |
| 5,254,984 | 10/1993 | Wakeland | 345/114 |
| 5,356,156 | 10/1994 | Suzuki et al. | 273/437 |
| 5,357,604 | 10/1994 | San et al. | 395/162 |
| 5,358,259 | 10/1994 | Best | 273/434 |
| 5,363,483 | 11/1994 | Jones et al. | 395/161 |
| 5,405,151 | 4/1995 | Naka et al. | 273/437 |
| 5,415,549 | 5/1995 | Logg | 273/437 |

VIDEO GAME SYSTEM AND METHODS FOR ENHANCED PROCESSING AND DISPLAY OF GRAPHICAL CHARACTER ELEMENTS

This is a continuation of application Ser. No. 08/381,563 filed on Dec. 31, 1994, abandoned.

TECHNICAL FIELD

This application relates generally to videogame systems, including the use of videogame cartridges (or equivalents such as cable-provided game software), game consoles and video screen displays, and in particular, this application relates to a videogame system which includes features enabling the storage, processing and display of graphical character elements exceeding prior expectations.

BACKGROUND OF THE INVENTION

The Sega Genesis videogame platform utilizes a 16 bit data format and limited video RAM (VRAM) capacity. The provision of additional ROM storage on game cartridges would adversely impact upon game pricing. With the introduction of higher data formats (32 bit and 64 bit), videogame players are becoming accustomed to richer graphics and more rapid processing. In order to serve the existing installed base of 16 bit videogame consoles, using affordable game cartridges, it is desirable to provide videogames which capture the richer graphics and rapid processing features of the newer 32 and 64 bit platforms without having to modify the platform hardware or the data format. These objectives are met according to the present invention.

SUMMARY OF THE INVENTION

The attributes of the videogame system and methods of the present invention which enhance the performance of the 16 bit platform fall into three categories. The first and second categories involve techniques which enable specific portions of a display screen to have attributes significantly different than the attributes of other parts of the display screen without having to store extra graphical character elements. The third category involves the use of techniques to dynamically change VRAM data storage to accommodate a significantly larger library of graphical character elements than previously permitted.

The first category involves a display list technology which links a graphical character element with a routine which enhances the display by changing or modifying one or more of the existing bits defining that character while that character element is being displayed. The display list technology involves the generation of vertical interrupts at specific locations on the display. During those interrupts, the routine associated with the graphical character element to be modified is automatically called and implemented. One example of this technology is to change the color palette used to color the character element to be displayed at that location.

The second technique involves the definition of a particular area, for example, a rectangular location, within the overall graphics map which has attributes different than the balance of the graphics map. One example of this technique is to define an area in which the character priority information stored in the 16 bit format is expressed, while in the remaining portions of the graphics map, the stored priority is suppressed and another single priority value is substituted.

The third technique involves the use of a virtual character library to increase the number of character spaces available using the VRAM allocation of 32K for character storage. According to this technology, when a character element is assigned to VRAM storage, it also determines the number of times that character is scheduled to appear in the immediately adjacent areas of the display. Each time the character element does appear, the number of appearances is decremented. When the number reaches zero, then the system is informed that this space in the VRAM can be assigned new character element data for generation of new character element displays.

DETAILED DESCRIPTION OF THE INVENTION

The current state of the relevant art indicates that fully programmable microprocessing to general graphical images on a raster based video display screen is well known. See, e.g., U.S. Pat. Nos. 4,871,167 and 5,357,604. The present application is written for those of ordinary skill in this highly developed art.

The present invention is described herein with reference to the implementation of these techniques on the Sega Genesis 16 bit platform running the COMIX ZONE™ game. However, this description is intended to illustrate the present invention and is not intended to limit the scope of the invention to the Sega Genesis or any equivalent 16 bit videogame systems. The present invention may clearly be implemented on 32 bit or 64 bit videogame systems. In addition, the game data and instructions can be provided on game cartridges with ROM, or it can be provided on CD/ROM. In addition, the game data and instructions can be obtained from cable delivery systems such as described in U.S. Pat. No. 5,251,909.

The videogame system of the present invention must have certain fundamental elements: (i) a console which contains a controller having a microprocessor and memory with the capability of communicating with a player-controlled input device and with a game program source including instructions and game dam and with the capability to create audio visual images on a raster-scanned display screen; (ii) a player-controlled input device for providing signal outputs to the console which are responsive to player input, primarily to control movable character x-y movements and to fire weapons and the like; and (iii) a game program source, for example a game cartridge with ROM or a cable source.

The videogame system of the present invention also must have the capability to implement character-tiles to generate background graphics on the raster-scanned display screen as well as to implement movable, player-controlled characters known as sprites. The videogame game program source includes instructions and game data which define the game rules and the dialogue system used to generate simulated speech balloons to convey emotion, story information and text effects.

Figure 1:
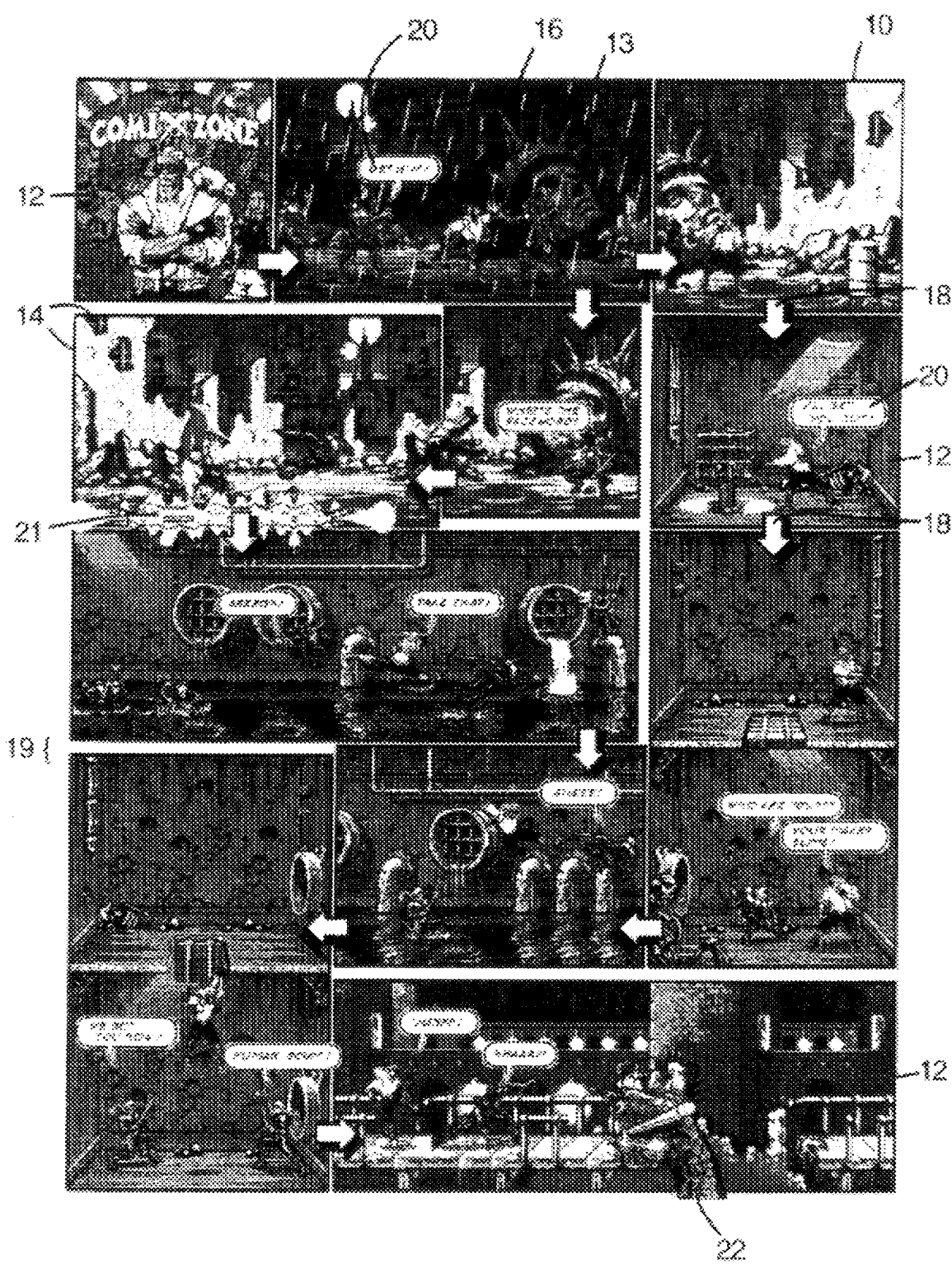
FIG. 1 is a graphical representation of a page layout showing the distinct panels which make up the story.

The major features of the present invention are best illustrated with reference to FIG. 1 which shows a page layout from the COMIX ZONE™ game. This game is representative of the type of enhanced games which can be implemented on the 16 bit platform. While the technologies of the present invention are hereinafter described with reference to the COMIX ZONE™ game, they are not intended to be limited to this application. The purpose of the description is to illustrate the invention with specific examples and not to limit the scope of the appended claims.

In the COMIX ZONE™ game, the page 10 is comprised of multiple panels 12 which are sequentially arranged to tell the story. In a preferred embodiment, the page layout dimensions are selected to simulate the familiar rectangular comic book page. The panel boundaries 14 define the panels 12 in space and time, and the player-controlled character 16 is restricted to play in an active panel 13 until he has completed certain predetermined combat and strategy tasks. In the embodiment implemented on the Sega Genesis 16 bit platform, the panels 12 are sequentially arranged such that the player-controlled character 16 can only move forward in the panel sequence and cannot revisit previously played panels on the page layout. This forward-only feature is an attribute of the preferred embodiment but it is not essential to the present invention, and the appended claims are not intended to be limited to this forward-only feature.

The panel sequence options are presented to the player through the use of directional arrows 18 which signal the direction in which the player-controlled player can move. At certain panels, the player may have to choose among alternative routes through the page layout. This feature allows certain variability to game play, providing greater player interest and variety. In between the panels 12 are panel breaks 19 which help to emphasize comic-book-look of the videogame system and its associated graphics. The story told by the sequential arrangement of panels 12 is further enhanced by the use of a dialogue system which simulates speech balloons 20 to convey emotion, story information and text effects. In a preferred embodiment of the present invention, additional animation effects 21 are provided to enhance the comic book nature of the game. In particular, when a bomb explodes, the background is torn in the panel. In another example from the preferred embodiment, the "comic book world" inside the panel is distinguished from the "real world" outside the panel by graphics such as the cartoonist's hand 22 drawing character elements in the panels.

Figure 2:
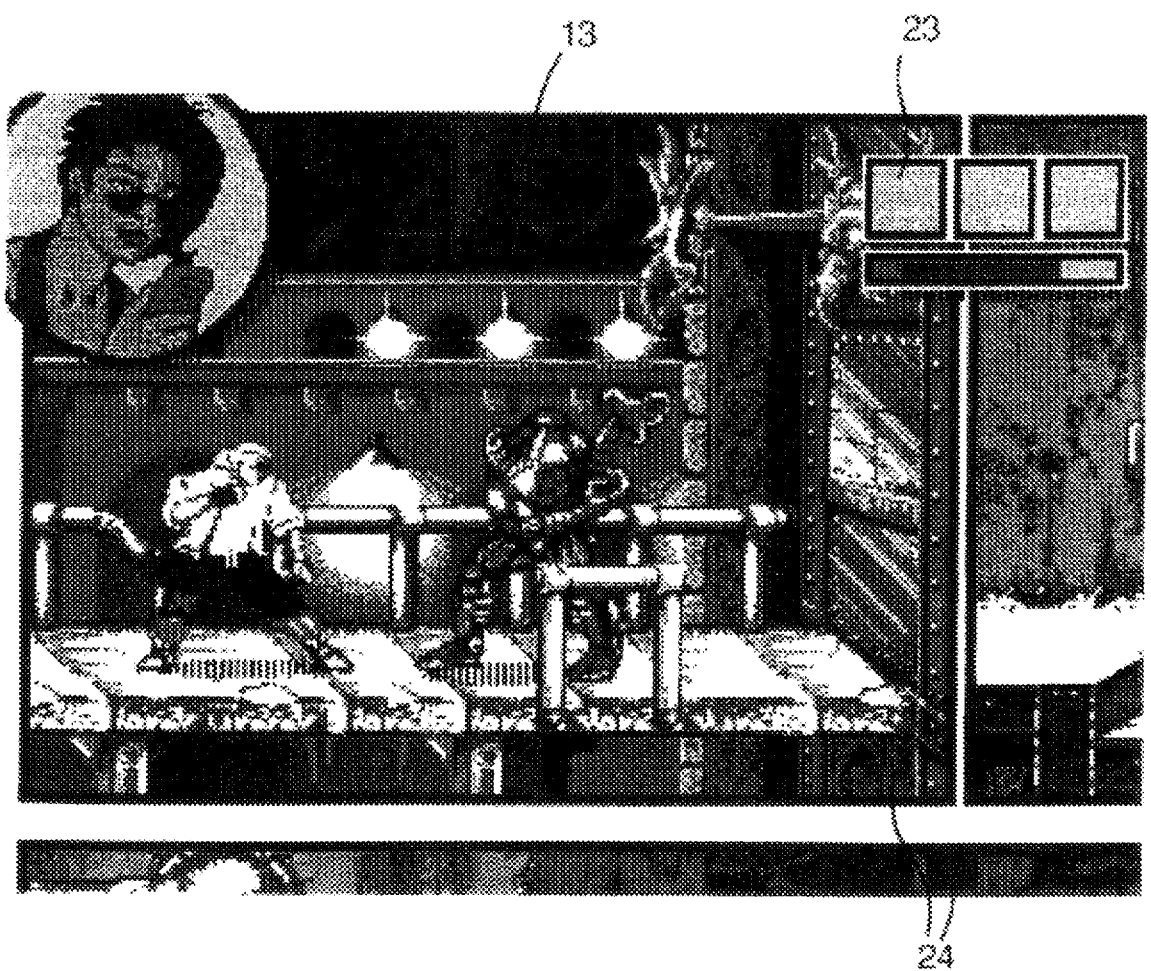
FIG. 2 is a graphical representation of a video display screen showing the relationship between the screen display and the panels.

FIG. 2 shows a toolbar 23 which contains scoring information and items which the player-controlled character can collect and use to perform the predetermined panel tasks and to carry forward into subsequent panels. The player can score points during the game play based upon performance of the predetermined tasks.

FIG. 2 illustrates the video screen display. While the active panel 13 fills most of the screen display, it is possible to see portions of other panels 24 which are dormant. The distinction between active panels and dormant panels is explained more fully below, particularly with respect to how the player-controlled character is limited to play and display in the active panel.

Figure 3:
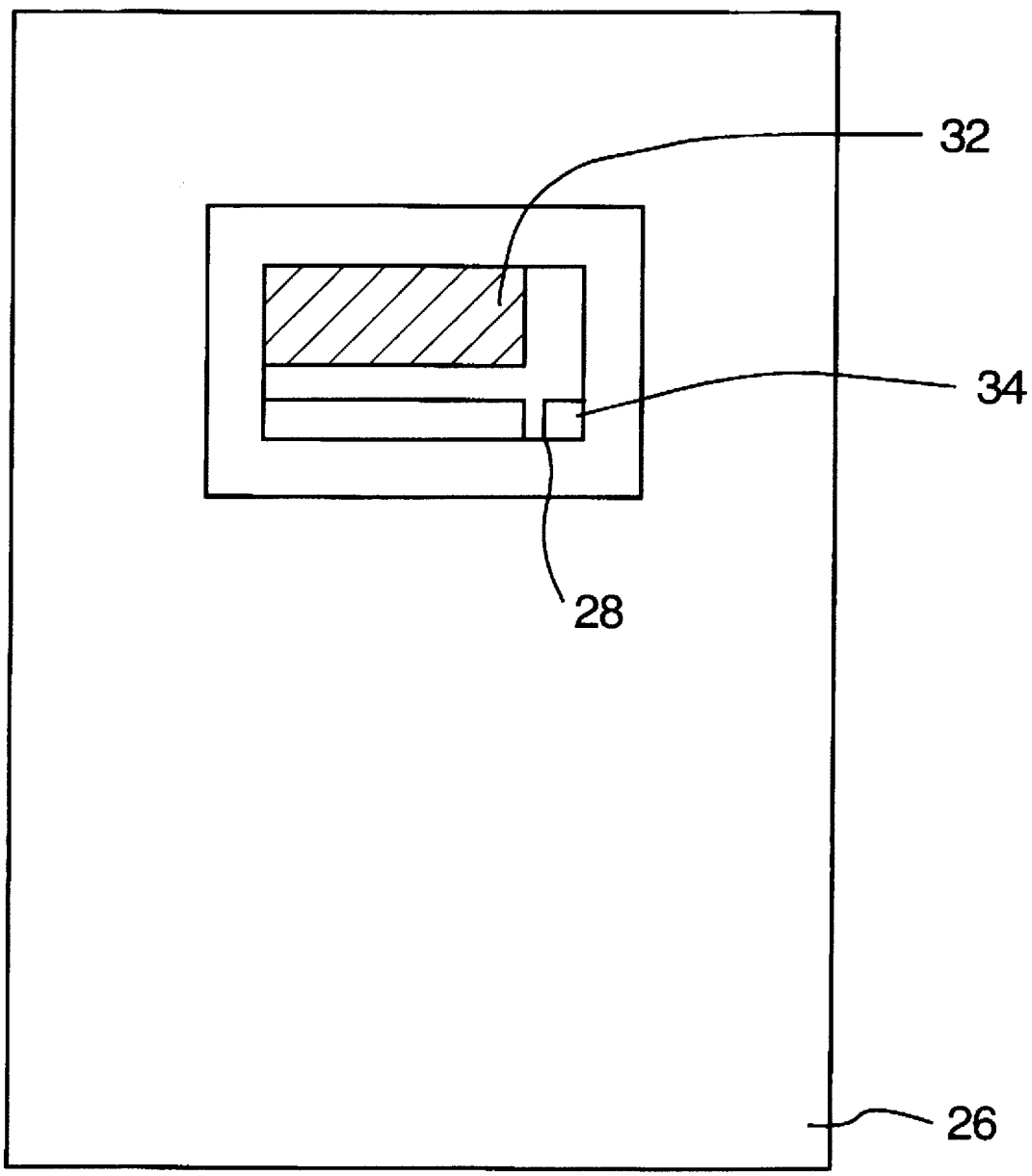
FIG. 3 is a diagram showing the relationship between the page layout and the video display screen.

The relationship between the page layout 26 and the screen display 28 is shown in FIG. 3. In the 16 bit embodiment, the graphical character element data for the page layout 26 is stored in compressed form in the game cartridge ROM.

The data compression technology is referred to as LZSS. It was described and Haruhiko Okumura, which appears not to have been published in the normal technical literature. The relevant portions are provided here.

LZSS Coding

This scheme is initiated by J. Ziv and A. Lempel, IEEE Trans. IT-23,337–343 (1977). A slightly modified version is described by J. A. Storer and T. G. Szymanski, J. ACM, 29 928–951. An implementation using a binary tree is proposed by T. C. Bell, IEEE Trans. COM-34, 1176–1182 (1986). The algorithm is quite simple: Keep a ting buffer, which initially contains "space" characters only. Read several letters from the file to the buffer. Then search the buffer for the longest string that matches the letter just read, and send its length and position in the buffer.

If the buffer size is 4096 bytes, the position can be encoded in 12 bits. If we represent the match length in four bits, the <position, length> pair is two bytes long. If the longest match is no more than two characters, then we send just one character without encoding, and restart the process with the next letter. We must send one extra bit each time to tell the decoded whether we are send a <position, length> pair or an unencoded character.

The accompanying file LZSS.C is a version of this algorithm. This implementation uses multiple binary trees to speed up the search for the longest match. The programs in this article were written in draft-proposed ANSI C and were tested with Turbo C 2.0.

A portion 30 of the entire page layout 26 is decompressed and prepared for display on the display screen 28. Within the display screen 28, there is an active panel 32 and portions of dormant panels 34 are shown. In the preferred embodiment, the active panel 32 has character generation attributes which are different from the other portions of the screen display 28 which causes a difference in appearance. The expression of these different attributes in the active panel versus the rest of the display (and the rest of the page layout) is made possible by defining the rectangular area within the active panel 32 differently from the balance of the page layout 26. This location-dependent graphical capability enables the presentation of different graphical effects and different player-controlled character display capabilities for the active panel 32 versus the balance of the display screen 28.

While a zoom feature is not part of the embodiment implemented on the 16 bit platform, it is possible to provide a videogame system in which the player has the option to view the entire page layout on the display screen and then to "zoom" into the specific panels of interest for a more selective and close-up view of the active panel.

In the COMIX ZONE™ game as implemented on the Sega Genesis 16 bit platform, there were a number of hardware and software limitations which had to be overcome to enable a plausible comic book simulation game. The source code for the COMIX ZONE™ game program is attached hereto as Appendix I. Some of these implementation problems and solutions are specifically described below.

Priority Technology To Allow Depth

Referring to FIG. 3, in order to visually distinguish the active panel 32 (the panel in which the player-controlled character is currently performing tasks) from any dormant panels 34 which are shown on the display screen 28, the display graphics are processed differently depending on location so that the character element graphics in the active panel have a greater three dimensional feel than those displayed in the dormant panels which are flatter in appearance. This visual distinction between a three dimensional feel and a flat appearance is controlled by the use of character "priorities," which instruct the 68000 series microprocessor and video RAM ("VRAM") on board the Sega Genesis platform how the various graphic elements should be displayed relative to the other graphic elements in the scene. Higher priority character elements come to the foreground of the scene, and mask or the priority over any other graphic elements which are in the same location but which have lower priority. For example, the background in a particular scene may be a mountain range, and the desired foreground is a series of rocks. In order to enable the rocks to appear in front of the mountain range, the rocks must be assigned a higher priority than the mountains in that particular region of the display. One of the primary distinctions between the dormant panels and the active panels is the relative priorities of the character elements. In the active panel, the character elements are displayed using their stored priorities producing a depth perception or three dimensional appearance because the character elements have relative priorities, placing them on different planes within the screen display. The dormant panels are characterized by graphical character elements having a single high priority so that the elements are essentially displayed on a single plane within the screen display, leading to the flat appearance within the dormant panels.

Another significant visual distinction between the active panel and the dormant panels which was desired to enhance the episodic nature of the comic book simulation was the appearance and behavior of the player-controlled character. In the active panel, the player-controlled character is permitted free movement within the boundaries of the active panel. However, the player-controlled character does not appear outside the boundaries of the active panel, even if the player causes the player-controlled character to travel outside of these boundaries. The player-controlled character should not appear in the dormant panels. This effect is also achieved through the use of character priority data processing.

The 16 bit platform provides a challenge to the presentation of graphic character elements as three dimensional in a single active panel and flat-appearing graphics in all other locations (as well as containing display of the player-controlled character to the active panel) because the 16 bit platform has limited memory space and because data format for the 16 bit platform provides only one bit for priority. Both of these challenges are met in the COMIX ZONE™ game by defining the rectangle of the active panel differently from all other regions of the page layout for purposes of the display engine. In the active panel, the single priority bit stored as a regular part of the character data is expressed to create the perception of depth within the active panel because all of the elements will have varying relative priorities. In the remaining portions of the page layout (i.e., the dormant panels and breaks between them), all character element priorities are set to a single high value which gives them a flat appearance because there is no relative variation in display priority, causing them all to appear on a single plane. This priority shifting outside of the active panel also insures that the player-controlled character will have a lower priority than all of the other character elements which have all been given a high priority for all regions of the page layout outside of the active panel.

It is worth noting at this point that the term "character" is used in two different ways. In one sense, "character" is used to refer to "tiles" or 8×8 pixel blocks which make up the visual presentation of the videogame. The second use of "character" is in its more familiar sense—a character in a story. It is important to keep this distinction in mind when referring to the priority technology.

The Sega Genesis display engine handles the movable characters (such as the player-controlled character) separately from the tile-characters, and generates their display differently than the tile-characters. Nonetheless, the priority technology feature which sets the tile-character priorities to a uniform high value outside the rectangular area of the active panel will still have the same effect on the player-controlled character. The higher priority tile-characters outside of the active panel will obscure the display of the player-controlled character.

Consequently, in the COMIX ZONE™ video game, character priority is made a function of location (within the active panel or not). Since the data format for storing character information allows only one bit for priority information, character priority cannot be made and stored as a function of location because of the 16 bit hardware limitation, and its allocation of 1 bit to priority data. Since the data format only permits storage of a single priority bit, the desired effect of differing appearances cannot be achieved simply using the 16 bit data format. The problem encountered is providing the capability to enable panel-dependent character priority without storing an additional bit of priority data, or without storing the same character graphics multiple times with differing priorities.

These limitations have been overcome in the 16 bit platform. The game graphics data is stored as one large page layout, containing multiple panels. The video console microprocessor can determine which part of the page layout (panels) will be displayed by the display screen at any particular time. The problem of location-dependent priority is solved by defining arbitrary rectangles (corresponding to the active panel) in which the character element graphics are displayed using their stored priority dam to create the three-dimensional appearance because the character elements appear on different planes. On the other hand, in a dormant panel on the display screen (and all other regions of the page layout), the normal character priority information stored with the 16 bit character data is suppressed and all character elements are assigned the same high priority to create the desired flat appearance in the dormant panel. Thus, if the video console microprocessor determines that a particular section of the display screen falls within the predefined rectangle (the active panel), then it utilizes the previously-stored character element priority information to create the three dimensional feel of the active panel. In the dormant panels, the stored priorities are suppressed and replaced by a single uniform value to provide character elements with a single high priority to create a flat appearance. What is truly occurring is that an area of the bit map has been defined in which to apply a function (suppress original priority data bit and substitute new value) if the character element falls outside of the predefined rectangle (the active panel). Therefore, the character element does not have to be stored more than once with different priorities depending on location and whether the panel is then active. Instead, the game code provides a routine which enables expression of the stored character priority if it falls within the predefined rectangle, and to otherwise suppress and replace the stored priority bit.

Display List Allowing Display Modification

In the COMIX ZONE™ game, the art style employs a lot of strong colors, flat shaded areas and exaggerated animation. It also employs a number of special effects, like rain falling down, streams flowing and characters standing in water. There are also animation effects which emphasize the "paper" nature of the game such as tearing up the paper into little pieces or burning holes into the paper. In order to accomplish each of these special graphics effects using the 16 bit platform, certain parallel processing or multitasking capabilities were implemented in order to provide the special graphics effects at the right place at the right time.

According to the present invention, the display list technology is used to insure that a desired graphical effect is implemented at a specific location and at a specified time on the display screen. For example, the display list can be used to change the color palette for the display of certain character elements which appear in a specified region of the display, or the display list can be used to cause water in a particular area to shimmer by mining on the bit which corresponds to the shimmer effect. The display list is a management system which changes attributes of character elements as a function of time and location on the video display screen within the parameters of acceptable display and processing timing.

The display list technology takes advantage of some existing attributes of the 16 bit platform to create the desired special effects without having to employ a completely different system. The Sega Genesis display engine has a system which causes a horizontal blank interrupt to occur at time zero and then at regularly spaced intervals during the generation of the horizontal scan lines which comprise the video screen. Because of its regularity, this interrupt scheme limits its use for generating special effects at specific locations on the display screen. The present invention permits the generation of horizontal interrupts at arbitrary locations on the display screen, alternate to those regularly generated by the Sega Genesis console.

Figure 4:
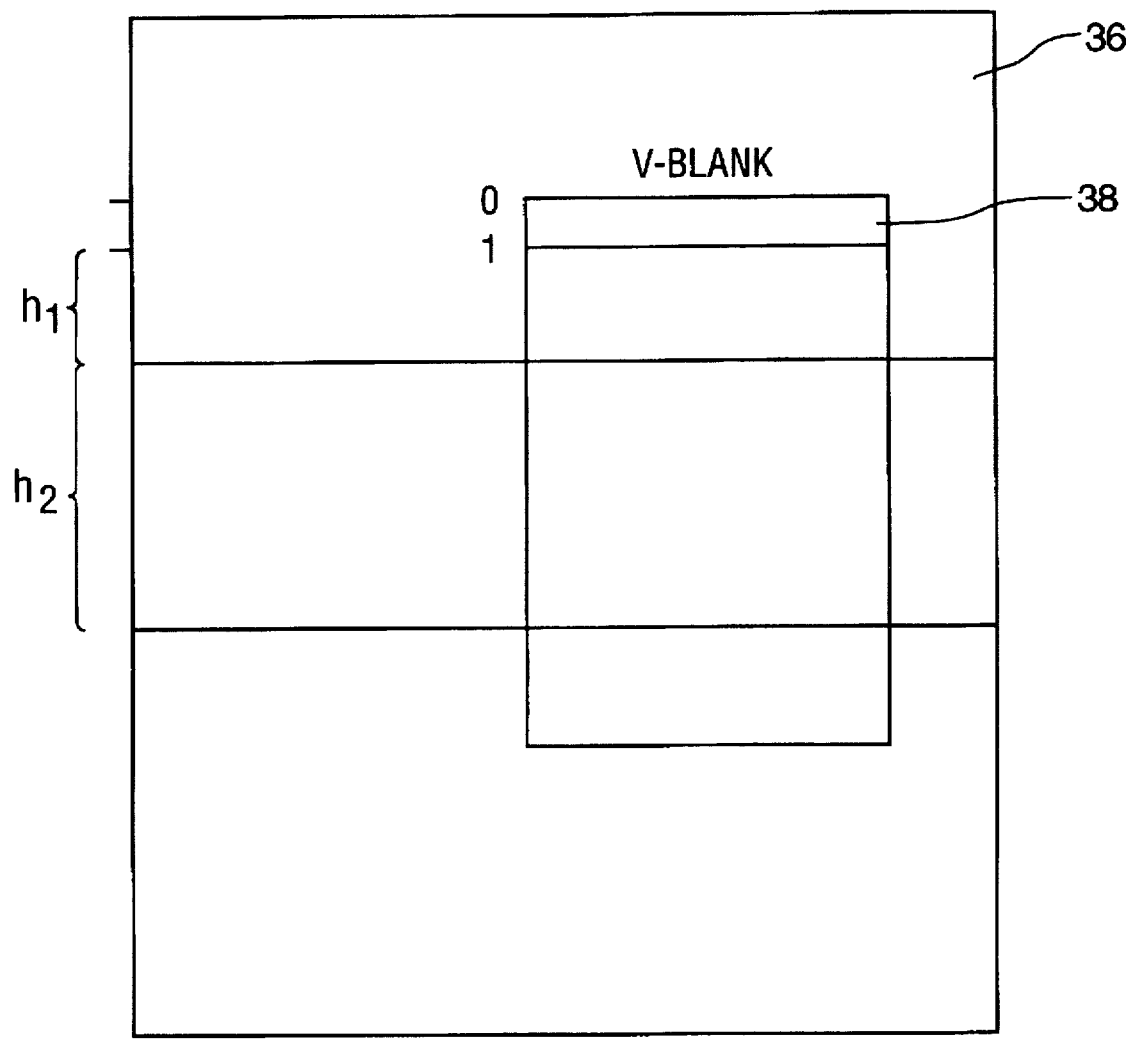
FIG. 4 is a diagram showing the creation of vertical interrupts in the generation of the video display screen at specified horizontal scan line locations in order to implement a desired special graphical effect at a specific location on the video display screen.

The present invention is explained with reference to FIG. 4. The page layout 36 has a smaller portion 38 which represents the video display screen having horizontal scan lines (not individually shown). At certain locations on the page layout 36, there are special graphical character elements which require more character data storage than permitted by the 16 bit data format. These "events" in space and time on the page layout 36 are shown as occurring at horizontal lines $h_1$ and $h_2$. Since the Sega Genesis platform has regularly spaced vertical interrupts which are defined by registers which identify where the interrupts should take place and how many horizontal scan lines must be counted before the next vertical interrupt, the present invention provides a software routine for modifying the register information. In the source code attached as Appendix I, the routine entitled TASKER.68K contains Hbl_vbl and hbvl_hbl.

Another hardware feature of the Sega Genesis console is that the interrupt always occurs at one scan line less than the intended scan line. In order to cause the vertical interrupt to occur at the desired alternate location, the register conversions set forth in Table 1 are required. The Sega Genesis system is based upon a design in which the register is not used directly. Instead, the system takes the latched value and decrements an internal value r0 is the latched horizontal blank counter (counting scan lines) r1 is the actual horizontal blank counter.

TABLE 1

| Horizontal Scan Line | Register Value | Register Value |
| --- | --- | --- |
| 0 | r0=(h1−1)−1 | r←0 |
| 1 | r0=(h2−h1)−1 | r1←(h1−1)−1 |
| h1 | r0=(h3−h2)−1 | r1←(h2−h1)−1 |

Once the vertical interrupt is caused at the specific horizontal scan line on which the special graphical effect is desired, the display list technology automatically calls the routine associated with the desired special effect and implements it at that location. The routines can be assembled as a list and the desired routine called from the list and implemented during the vertical blank occurring at that time and place.

Some of the applications of the display list technology in the COMIX ZONE™ game include changing the color palette used to color the graphical character elements and then changing it back to the original color palette, turn on the shimmering water effect, and to make the screen darker in a particular location.

Dynamic VRAM Character Allocation

The 16 bit platform has a specific capacity for storage of graphical character element data in the VRAM. One of the challenges faced in the implementation of the COMIX ZONE™ game on the 16 bit platform involves the use of an increased number of graphical character elements to provide rich, strong graphics. In order to enable this capability for the COMIX ZONE™ game, it was necessary to develop a way to define graphical character elements in the VRAM even though it involved more storage than the VRAM hardware in the 16 bit platform could accommodate.

In prior videogame programs written for the Sega Genesis platform, graphical character elements had the following format for the character data:

| P | C | Y | X | Character |
|---|---|---|---|---|
| 15 | 13–14 | 12 | 11 | 10–0 |

(P = Priority; C = Color; X, Y = Symmetrical Reflections)

This data format enables the definition of 2048 graphical character elements.

According to the present invention, a modified data format is provided in order to obtain the capacity to store up top 4096 graphical character elements:

| P | C | Y | X | Character |
|---|---|---|---|---|
| 15 | 14 | 13 | 12 | 11–0 |

The decreased color data in this data format is accommodated by the ability to use multiple color palettes as described above with reference to the display list technology.

Figure 5:
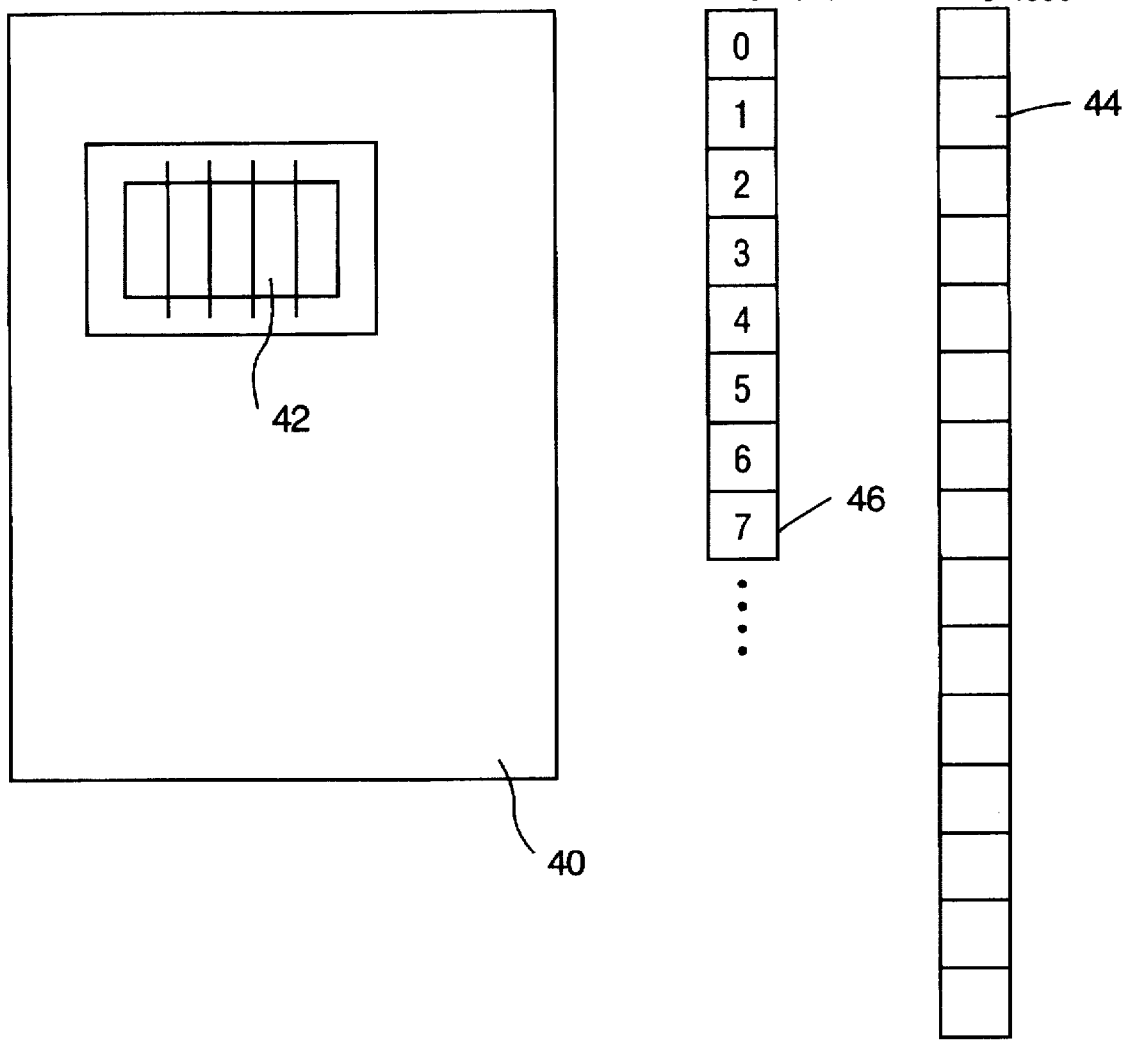
FIG. 5 is a diagram showing the mapping relationship between virtual character elements and VRAM character element storage as implemented on a 16 bit console.

The 64K VRAM allocates 32K of the 64K to store approximately 1023 character elements. The Sega Genesis display engine determines which character elements are to be displayed in the portion of the page layout to be shown on the screen. The VRAM contains the character elements which should be displayed. According to the present invention, a virtual character element table is created which can be used to map more character elements into the VRAM than can be stored in the VRAM alone. This capability is described with reference to FIG. 5.

The page layout 40 is comprised of a series of character elements. The portion of the page layout which will be displayed on the screen is shown as the region 42. The region 42 is made up of a series of character elements which are called out of the ROM 44 where they are stored as virtual characters, and then placed into the VRAM hardware character storage 46. The display engine also determines how many times that the character element will appear in region 42, and increments the character element count each time that the character element to be displayed is actually displayed. As an area (a vertical rectangular section of region 42) moves off of the display screen, the display engine decrements the character element count for the number of times that character element appeared in the prior area. When the count reaches zero, the display engine determines that the hardware character in the VRAM has become free and available for use to display other character elements. Thus, when the display engine needs to assign VRAM storage space to a previously unused character element stored in the virtual character table, it determines which VRAM hardware character space is available and maps the character element from the virtual character table into the VRAM storage.

In the preferred embodiment, the list of vacant spaces on the VRAM character element storage is linked in the order that the vacancies appear. This allows the display engine to use the top of the list first to increase the probability that the vacant character element will not reappear.

The source code routines which correspond to the allocation of VRAM storage space can be found under the title CACHSCRL.68K.

Another feature of the embodiment running on the 16 bit platform involves the programming of the console microprocessor to multitask, or to perform multiple tasks to utilize the maximum processing capability of the 68000 microprocessor. In its application to generate audiovisual presentations, the microprocessor is designed to accomplish its functions in 1/60th of a second intervals which correspond to the refresh rate on the video display screen. The multitasking approach utilized here recognizes that there is processing time left over in many instances, before 1/60th of a second has passed. The multitasking programming allows the microprocessor to use this additional time to perform other functions apparently simultaneous with the display function. The source code routine corresponding to the multitasking feature is found at TASKER.68K.

The dialogue system which is used in the present invention is found in the attached source code at BALLOON.68K. There is a routine which runs for each enemy and each panel which determines when an enemy needs to say something. For example, the routine is programmed so that if the player-controlled character strikes an enemy character, then the enemy character is programmed to say "Ouch?" The program logic determines what the character should say for each event. The program outputs a string of text which is converted to the Sega Genesis format bit map in RA<using a proportional bit map font. This text is uploaded to the VRAM, and the text is then surrounded by a balloon border using character-tiles. This hardware displayable sprite (combining the text and the border) is entered into the display sprite list.

Figure 6:
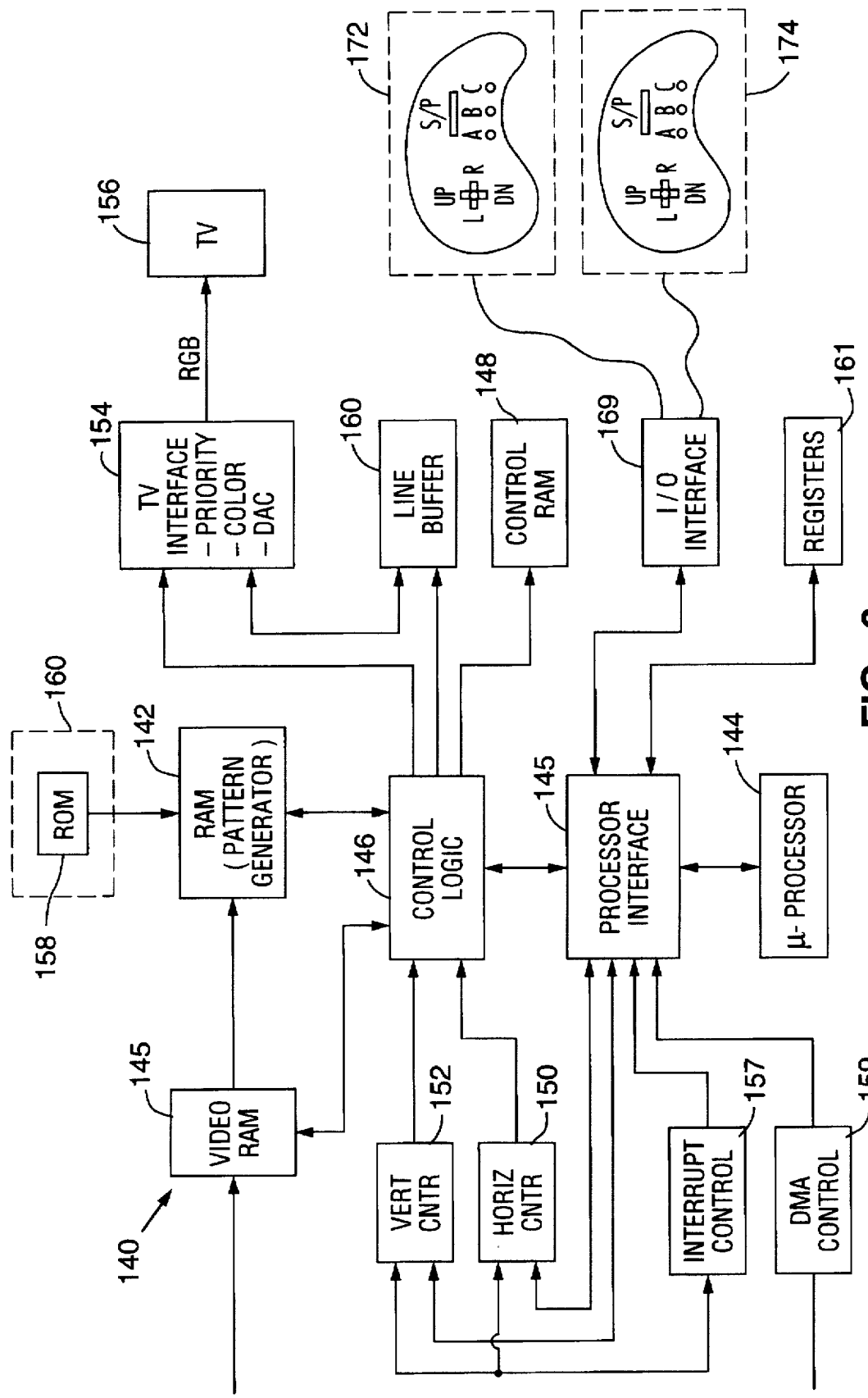
FIG. 6 is a block diagram of a videogame system according to the present invention.

Referring to the illustrative drawing of FIG. 6, there is shown a block diagram of videogame system 140 in accordance with the present invention. The system 140 includes a RAM 142, a video RAM (VRAM) 145, a Microprocessor 144, a processor interface 145, control logic 146, a control RAM 148, a horizontal counter control 150, a vertical counter control 152. The system 140 further includes interrupt control 157, direct memory access (DMA) control 159, a line buffer 160, registers 161 and an I/O interface 164. A TV interface circuit 154 provides RGB analog signals to TV system 156.

The RAM 142 (character data storage) receives graphics information from a cartridge-based ROM 158.

First and second external player controllers 172, 174 are connected to the system 40 through the I/O interface 164. The player controllers 172, 174 each include buttons to control game character movement. The first player controller 172 controls the movement of a first game character (sprite). The second player controller 174 controls movement of a second game character (sprite). The S/P button controls start/pause of game play. Buttons, A, B, C are used for special game features such as character attacking or character taking on special powers. Buttons labeled with L, R, Up, Dn are used to cause the game character to move left or right or to jump up or to crouch down.

In operation, the video RAM 145 stores graphics patterns for the sprite plane and for the scroll A and scroll B planes. As the TV displays screen is scanned line-by-line, patterns corresponding to the graphics information for the scroll A, scroll B and the sprite plane are retrieved, and three independent signals are produced which are representative of the graphics patterns for scroll A, scroll B and the sprites plane. A priority controller in the TV interface 154 selects the appropriate signal on a cell-by-cell basis according to designated priorities. A color decoder and DAC in the TV interface 154 receives the output of the priority controller and generates a corresponding RGB signal for transmission to the TV system 156.

While the present invention has been described with reference to a particular embodiment, it is understood that the disclosure has been made for purpose of illustrating the invention by way of example and is not intended to limit the scope of the attached claims. It is understood that components may be arranged in different ways and that equivalent devices can be substituted for those described here. These changes and substitutions are not intended to depart from the scope and the spirit of the present invention.

What is claimed is:

1. In a videogame system, having a video display and character data containing a priority bit which determines the position of that character relative to the background elements and other character elements in a video display, a priority mapping system which comprises:

a) videogame program source containing game data and game instructions for use by a system controller to provide an audiovisual presentation;

b) the system controller, including, a game microprocessor for executing a videogame program, a video display processor for providing a videogame audiovisual presentation on a display screen, coupled to the game microprocessor, and, a video random access memory for storing data for use in generating a video display, coupled to the video display processor;

c) the videogame audiovisual presentation comprising a plurality of panels separated by panel breaks, the plurality of panels comprising an active panel defined by a presence of a player-controlled character and dormant panels defined by an absence of a player-controlled character, the plurality of panels are arranged sequentially to form a page layout, each panel representing boundaries in space and time;

d) character data storage in which the character data is stored as a string of data bits, one of the bits corresponding to a video display priority for that character in the videogame audio visual presentation such that a character with a higher video display priority to a character with a lower display priority; and, e) a priority controller for interaction with the system controller and the character data storage, which determines which portion of the video display is the active panel and which portions of the video display will represent the dormant panels, and for the active panel portion, the priority controller directs the system controller to implement the display priority stored in the character data storage, and for the dormant panel portion of the video display, the priority controller overrides the stored display priority and implements high priority for all character elements in the dormant panel portion.

* * * * *

UNITED STATES PATENT AND TRADEMARK OFFICE
CERTIFICATE OF CORRECTION

PATENT NO. : 5,707,288
DATED : January 13, 1998
INVENTOR(S) : Adrian Stephens et al.

It is certified that error appears in the above-identified patent and that said Letters Patent is hereby corrected as shown below:

Col. 4, line 7, after and and before Haruhiko, insert -- provided in an article entitled 'Data Compression Algorithms of LARC and LHARC,' --;

Col. 4, line 17, replace "ting" with --ring--;

Col. 5, line 44, replace "fiat" with --flat--.;

Col. 6, line 38, replace "dam" with --data--;

Col. 7, line 19, replace "mining" with --turning--;

Col. 9, line 48, replace " 'Ouch?' " with --Ouch!--;

Col. 10, line 67, in Claim 1, after priority and before ; and, insert --when each character is mapped to appear on the display screen in the same position--.

Signed and Sealed this

Twenty-second Day of June, 1999

Q. TODD DICKINSON

*Attest:*

*Attesting Officer*    *Acting Commissioner of Patents and Trademarks*